(12) United States Patent
Horiuchi et al.

(10) Patent No.: US 11,273,626 B2
(45) Date of Patent: Mar. 15, 2022

(54) THERMALLY EXPANDABLE SHEET AND THERMALLY EXPANDABLE SHEET PRODUCTION METHOD

(71) Applicant: CASIO COMPUTER CO., LTD., Tokyo (JP)

(72) Inventors: Yuji Horiuchi, Higashiyamato (JP); Yoshimune Motoyanagi, Hamura (JP); Hideki Takahashi, Ome (JP); Satoshi Mitsui, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 490 days.

(21) Appl. No.: 15/898,287

(22) Filed: Feb. 16, 2018

(65) Prior Publication Data

US 2018/0272664 A1 Sep. 27, 2018

(30) Foreign Application Priority Data

Mar. 23, 2017 (JP) .............................. JP2017-058011

(51) Int. Cl.
*B32B 27/06* (2006.01)
*B32B 7/02* (2019.01)
(Continued)

(52) U.S. Cl.
CPC .............. *B32B 27/065* (2013.01); *B32B 5/18* (2013.01); *B32B 7/02* (2013.01); *B32B 27/32* (2013.01);
(Continued)

(58) Field of Classification Search
CPC ........... B32B 5/18; B32B 27/065; B32B 3/26; B32B 3/263; B32B 3/28; B32B 7/02; B32B 27/32; B32B 2305/022; B32B 2307/75; B41M 7/0081; B41M 1/24; B29C 44/022; B29C 61/04; B29C 59/18; B29C 2035/0822; B29C 35/0805; B29C 59/19;
(Continued)

(56) References Cited

U.S. PATENT DOCUMENTS 4,871,407 A    10/1989   Honma et al.
4,871,408 A * 10/1989   Honma .................... B41M 3/16
                                                                 156/83
(Continued)

FOREIGN PATENT DOCUMENTS

CN         102729680 A    10/2012
JP          S57-208219 A   12/1982
(Continued)

OTHER PUBLICATIONS

Translation of JP2010076132A (description and abstract). (Year: 2010).*

(Continued)

*Primary Examiner* — Catherine A. Simone
(74) *Attorney, Agent, or Firm* — Scully Scott Murphy & Presser (57) ABSTRACT

A thermally expandable sheet in which a thermally expansive layer that contains a thermally expandable material is formed on one side of a base, and where the thermally expansive layer is distended, the base deforms following distension of the thermally expansive layer and the base deforms into an embossed shape.

14 Claims, 7 Drawing Sheets

(51) Int. Cl.
  *B32B 27/32* (2006.01)
  *B32B 5/18* (2006.01)
(52) U.S. Cl.
  CPC ..... *B32B 2305/022* (2013.01); *B32B 2307/75* (2013.01)
(58) Field of Classification Search
  CPC ......... B29C 44/22; B29C 44/24; B29C 44/26; B29C 44/28; B29C 44/203
  USPC .................................................... 428/195.1
  See application file for complete search history.

(56) References Cited

U.S. PATENT DOCUMENTS

| | | | |
|---|---|---|---|
| 5,912,070 A * | 6/1999 | Miharu | B32B 27/08 428/214 |
| 6,623,841 B1 * | 9/2003 | Venkatasanthanam | B41M 5/52 428/195.1 |

FOREIGN PATENT DOCUMENTS

| | | | | |
|---|---|---|---|---|
| JP | 59192530 A | * | 10/1984 | ............ B29C 59/18 |
| JP | 6287826 U | * | 6/1987 | |
| JP | S64-028660 A | | 1/1989 | |
| JP | S64-020358 U | | 2/1989 | |
| JP | 2001-150812 A | | 6/2001 | |
| JP | 2001-232734 A | | 8/2001 | |
| JP | 2010076132 A | * | 4/2010 | |
| JP | 2017-002190 A | | 1/2017 | |

OTHER PUBLICATIONS

Translation of JPS59192530A (bib and description). (Year: 1984).*
Translation JP6287826U. (Year: 1987).*
First Office Action dated Aug. 28, 2019 received in Chinese Patent Application No. CN 201810114810.8 together with an English language translation.
Notice of Reasons for Refusal dated Jun. 11, 2019 in Japanese Patent Application No. 2017-058011.

* cited by examiner

THERMALLY EXPANDABLE SHEET AND THERMALLY EXPANDABLE SHEET PRODUCTION METHOD

CROSS-REFERENCE TO RELATED APPLICATION

This application claims the benefit of Japanese Patent Application No. 2017-058011, filed on Mar. 23, 2017, the entire disclosure of which is incorporated by reference herein.

FIELD

This application relates to a thermally expandable sheet foaming and expanding according to the amount of heat absorbed and a method of producing the thermally expandable sheet.

BACKGROUND

In the prior art, thermally expandable sheets in which a thermally expansive layer containing a thermally expandable material foaming and expanding according to the amount of heat absorbed is formed on one side of a base sheet are known. The thermally expansive layer can be distended in part or in whole by forming a photothermal conversion layer converting light to heat on the thermally expandable sheet and irradiating the photothermal conversion layer with light. Moreover, methods of forming a stereoscopic, shaped object (a stereoscopic image) on the thermally expandable sheet by changing the shape of the photothermal conversion layer are also known (for example, see Patent Literature Unexamined Japanese Patent Application Kokai Publication Nos. S64-28660 and 2001-150812).

In such thermally expandable sheets, in order to express the shape of a stereoscopic image vividly with height difference, it is required to increase the distension height when the thermally expansive layer is foamed and distended.

In order to increase the distension height, it is conceivable to form a thick thermally expansive layer so that a large amount of thermally expandable material is present on the base. However, as a thick thermally expansive layer is formed, a problem is that the thickness of the entire thermally expandable sheet is increased.

The present disclosure is made with the view of the above situation and an objective of the disclosure is to provide a thermally expandable sheet having an improved distension height when the thermally expansive layer is distended and a method of producing the thermally expandable sheet.

SUMMARY

A thermally expandable sheet in which a thermally expansive layer that contains a thermally expandable material is formed on one side of a base, wherein
when the thermally expansive layer is distended, the base deforms following distension of the thermally expansive layer and the base deforms into an embossed shape.

A thermally expandable sheet production method includes:
a step of forming an anchor layer on one side of a base; and
a step of forming on the anchor layer a thermally expansive layer that is equal to or greater than the base in thickness and contains a thermally expandable material.

A thermally expandable sheet in which a thermally expansive layer that is thicker than a resin base and contains a thermally expandable material is formed on one side of the base, wherein
when the thermally expansive layer is distended, the base deforms following distension of the thermally expansive layer and the base deforms into an embossed shape.

BRIEF DESCRIPTION OF THE DRAWINGS

A more complete understanding of this application can be obtained when the following detailed description is considered in conjunction with the following drawings, in which.

DETAILED DESCRIPTION

The thermally expandable sheet and the method of producing the thermally expandable sheet according to an embodiment of the present disclosure will be described in detail below using the drawings.

Here, in this embodiment, a "stereoscopic image" means a shaped object and the shaped object includes a wide range of shapes such as simple shapes, geometrical shapes, and characters. Furthermore, the shaped object includes decoration formed as a result of decorating. The decoration means something that evokes of a sense of beauty visually and/or tactually. Moreover, "stereoscopic image formation" includes not only forming a shaped object but also decorating (ornamenting).

Figure 1:
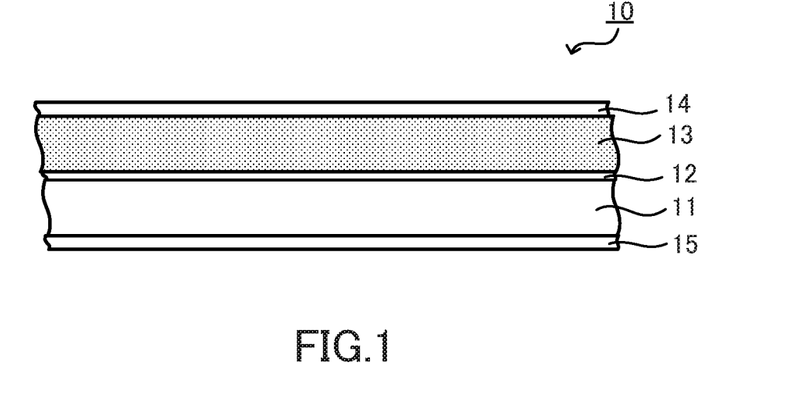
FIG. 1 is a cross-sectional view outlining the thermally expandable sheet according to an embodiment.

A thermally expandable sheet 10 comprises, as shown in FIG. 1, a base 11, an anchor layer 12, a thermally expansive layer 13, a first ink reception layer 14, and a second ink reception layer 15. Moreover, as described in detail later, the thermally expandable sheet 10 undergoes printing by a stereoscopic image formation system 50 outlined in FIGS. 4A to 4C and has a shaped object having an uneven surface (a stereoscopic image) formed. Moreover, as described in detail later, the thermally expandable sheet 10 of this embodiment is characterized in that the base 11 deforms following the thermally expansive layer 13 as shown in FIG.

Figure 2:
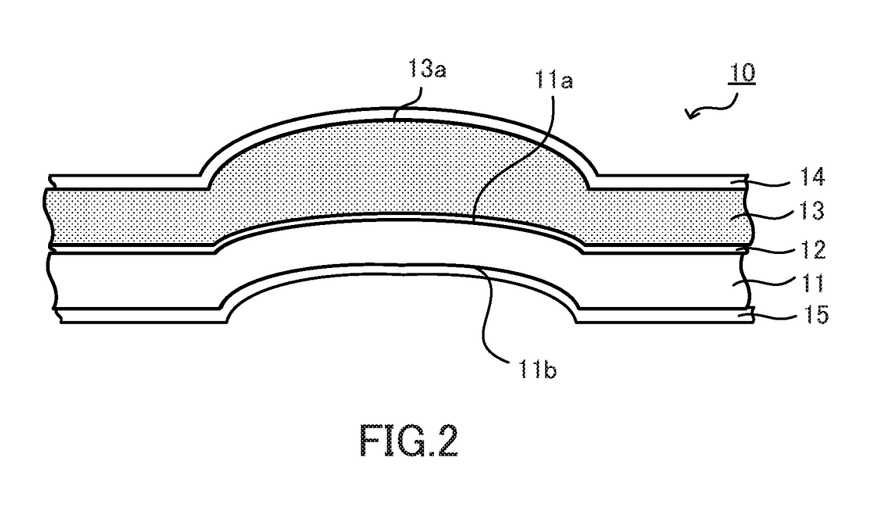
FIG. 2 is a cross-sectional view schematically showing an exemplary distended thermally expansive layer of the thermally expandable sheet according to the embodiment.

2 when print is made by the stereoscopic image formation system 50 and the thermally expansive layer 13 is distended.

The base 11 is a sheet-like member supporting the thermally expansive layer 13 and the like. As the base 11, paper such as high-quality paper and medium-quality paper or a conventionally used resin sheet-like (including a film) material can be selected as appropriate for use. As the resin sheet, for example, a sheet containing resin selected from polyolefin-based resin such as polyethylene and polypropylene, polyester-based resin, polyamide-based resin such as nylon, polyvinyl chloride-based resin, polyimide-based resin, silicone-based resin, and the like can be used. Moreover, in this embodiment, as described in detail later, the base 11 is characterized by deforming following distension of the thermally expansive layer 13 when the thermally expansive layer 13 is heated and foams and distends in whole or in part. Therefore, the base 11 is required to be easily thermally deformable and the material of the base 11, the thickness of the base 11, and the like are selected so as to make thermal deformation easy. For example, it is preferable that the base 11 is formed to a thickness equal to or less than the thickness of the thermally expansive layer 13.

The base 11 deforms in the direction of the thermally expansive layer 13 distending to follow the thermally expansive layer 13 when the thermally expansive layer 13 is foamed and distended, and maintains the shape after the deformation. More specifically, as the thermally expansive layer 13 distends, a bulge 13a shown in FIG. 2 is formed on the thermally expansive layer 13. While this bulge 13a is formed, the distension force acts in the direction opposite to the base 11 (upward shown in FIG. 2). Drawn by this distension force, the base 11 deforms. Then, as shown in FIG. 2, a bulge 11a is formed on the front side of the base 11 to protrude from the surrounding region. Moreover, an indentation 11b corresponding to the shape of the bulge 11a formed on the front side is formed on the back side of the base 11. In this specification, the shapes of the bulge 13a of the thermally expansive layer 13 and the bulge 11a and the indentation 11b of the base 11 as described above are expressed as embossed shapes.

In one technique of so-called embossing, corresponding uneven shapes are formed in upper and lower molds, and a base such as paper is clamped between the upper and lower molds to form the uneven shapes in the base. On the other hand, in this embodiment, the base 11 deforms as a result of being drawn by the distension force of the thermally expansive layer 13 and therefore, a shape precisely identical in detail to the shape of the distended thermally expansive layer as in embossing might not form on the back side of the base 11. For example, when a shape having a two-dimensionally and/or three-dimensionally intricate outline such as one with multiple protrusions or multiple steps is formed on the thermally expansive layer 13, the intricate outline such as protrusions or steps does not appear on the back side of the base 11. The shape appearing on the back side of the base 11 is simplified in outline and the outline is not precisely identical in detail. However, the bulge 11a and the indentation 11b formed on the base 11 are formed immediately below the bulge 13a formed on the thermally expansive layer 13 and formed in nearly the same region. Moreover, the shape of the bulge 11a is overall the shape of the bulge 13a reduced in size and so is the shape of the indentation 11b. Thus, similar to a shape yielded in embossing, the shape of the base 11 as in this embodiment can be expressed as an embossed shape.

Moreover, as the base 11 deforms as described above, compared with the case in which only the thermally expansive layer 13 distends, the distension height is increased by the amount of deformation of the base 11 and an effect of increasing the overall distension height is obtained. In other words, from the viewpoint of the entire thermally expandable sheet 10, the post-distension height is the distension height of the thermally expansive layer 13 itself and the height from deformation of the base 11. Therefore, even if the distension height of the thermally expansive layer 13 itself is reduced, the distension height can be compensated by the base 11, whereby it is possible for the thermally expandable sheet 10 to overall obtain an improved distension height. Moreover, for obtaining the same distension height, compared with the prior art configuration in which the base does not deform, it is possible to form the thermally expansive layer 13 thinner by the obtained amount of deformation of the base 11.

Here, in this embodiment, it is not the entire base 11 under the region where the thermally expansive layer 13 distends that deforms. When the thermally expansive layer 13 is distended to a specific thickness or more, the back side of the base 11 deforms into an embossed shape. When the density of a light-to-heat converting layer is reduced and the thermally expansive layer 13 foams and distends to a lower extent, the base 11 may not deform. Therefore, this embodiment does not intend to deform the entire base 11 under the region where the thermally expansive layer 13 is distended but intends to deform into an embossed shape the base 11 under the region where the thermally expansive layer 13 is distended to a specific height or more.

The anchor layer 12 is provided on one side (the top surface shown in FIG. 1) of the base 11 and the thermally expansive layer 13 is formed on the anchor layer 12. The anchor layer 12 is a layer with improved adhesiveness to the base 11 and the thermally expansive layer 13 and suppresses separation of the thermally expansive layer 13 from the base 11 when the thermally expansive layer 13 distends. The anchor layer 12 contains, for example, at least one resin selected from a group comprising polyester, acryl, and polyurethane, or their copolymers. For example, the resin contained in the anchor layer 12 may include, for example, only polyester-based resin or include polyester-based resin and polyurethane-based resin. Moreover, the resin contained in the anchor layer 12 may be denatured by a denaturant. Particularly, it is preferable in this embodiment that the anchor layer 12 contains polyester/acryl/urethane-composite resin. Here, examples of aqueous dispersion containing polyester/acryl/urethane-composite resin include, but are not limited to, "WAC-17XC" from Takamatsu Oil & Fat.

In this embodiment, the base 11 deforms following distension of the thermally expansive layer 13 as described above. Therefore, it is preferable that the base 11 and the thermally expansive layer 13 sufficiently adhere to each other so as not to separate and it is preferable that the anchor layer 12 is provided between the two. Here, the anchor layer 12 can be omitted if the base 11 and the thermally expansive layer 13 sufficiently adhere to each other and do not easily separate due to distension of the thermally expansive layer 13.

The thermally expansive layer 13 is formed on the anchor layer 12 provided on one side (the top surface shown in FIG. 1) of the base 11. The thermally expansive layer 13 is a layer distensible to a dimension corresponding to the heating temperature and the heating time and comprises multiple thermally expandable materials (thermally expandable microcapsules or micro powder) dispersed in a binder. Moreover, as described in detail later, in this embodiment, a photothermal conversion layer is formed on the first ink reception layer 14 provided on the uppermost surface (the front side) of the base 11 and/or on the underside (the back side) of the base 11 and is irradiated with light (electromagnetic waves) to cause the regions where the photothermal conversion layer is provided to generate heat. Absorbing the heat generated in the photothermal conversion layer on the front side and/or on the back side of the thermally expandable sheet 10, the thermally expansive layer 13 foams and distends, whereby it is possible to selectively distend only particular regions.

As the binder, a thermoplastic resin selected from vinyl acetate-based polymers, acrylic polymers, and the like is used. Moreover, the thermally expandable microcapsules comprise propane, butane, or other low-boiling vaporizing substances sealed in a thermoplastic resin shell. The shell is formed by, for example, a thermoplastic resin selected from polystyrene, polyvinyl chloride, polyvinyliden chloride, polyvinyl acetate, polyacrylic acid ester, polyacrylonitrile, polybutadiene, or copolymers thereof. The average particle size of the thermally expandable microcapsules is approximately 5 to 50 μm. As the microcapsules are heated to the thermal expansion start temperature or above, their polymer resin shell softens, the encapsulated low-boiling vaporizing substances vaporize, and the pressure causes the capsules to distend. Although depending on the characteristics of the microcapsules used, the microcapsules distend to five or so times the pre-distension particle size.

The first ink reception layer 14 is formed on the thermally expansive layer 13 formed on one side of the base 11. The first ink reception layer 14 is a layer receiving and fixing ink used in the printing step, for example ink of an inkjet printer. The first ink reception layer 14 is formed using a general-purpose material according to the ink used in the printing step. For example, in the case of using water-based ink, the first ink reception layer 14 is formed using a material selected from porous silica, polyvinyl alcohol (PVA), and the like.

The second ink reception layer 15 is formed on the other side of the base 11. Like the first ink reception layer 14, the second ink reception layer 15 is a layer receiving and fixing ink used in the printing step, for example ink of an inkjet printer. The second ink reception layer 15 is also formed using a general-purpose material and for example in the case of using water-based ink, formed using a material selected from porous silica, polyvinyl alcohol (PVA), and the like. Particularly, when a material that is poor in receiving ink such as plastic film is used for the base 11 and furthermore the photothermal conversion layer is formed on the back side of the base 11, it is preferable to provide the second ink reception layer 15 as shown in FIG. 1. Here, the second ink reception layer 15 can be omitted depending on the material of the base 11 and the intended use of the thermally expandable sheet 10 such as when the base 11 can receive and fix ink or when the photothermal conversion layer is formed only on the front side of the thermally expandable sheet 10.

(Method of Producing the Thermally Expandable Sheet)

The method of producing the thermally expandable sheet 10 will be described next using FIGS. 3A to 3D.

First, a sheet-like material, for example a polyethylene terephthalate (PET) sheet, is prepared as the base 11. The base 11 can be in the form of a roll, or precut. At this point, the material and thickness of the base 11 are selected to make thermal deformation easy so that the base 11 can deform following distension of the thermally expansive layer 13. For example, it is preferable that the base 11 is formed to a thickness equal to or less than the thickness of the thermally expansive layer 13.

Figure 3A:
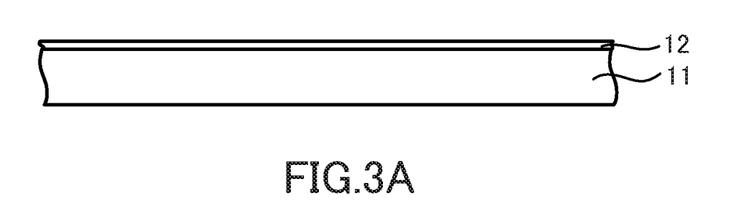
FIGS. 3A to 3D are cross-sectional views outlining the thermally expandable sheet production method according to the embodiment.

Next, for forming the anchor layer 12, a coating liquid containing, for example, at least one resin selected from a group comprising polyester, acryl, and polyurethane or their copolymers is prepared. Subsequently, the coating liquid is applied on the base 11 using a known coating device such as a bar coater, a roll coater, or a spray coater. Subsequently, the coating is dried to form the anchor layer 12 as shown in FIG. 3A.

Figure 3B:
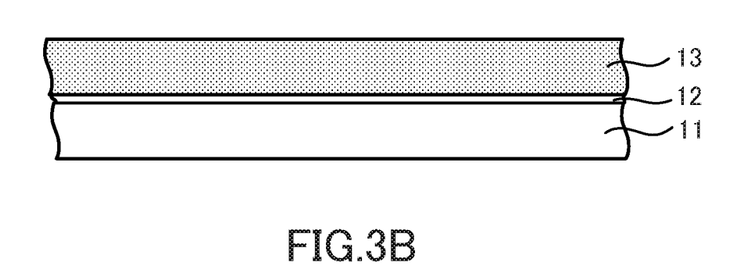

Next, a binder comprising a thermoplastic resin or the like and a thermally expandable material (thermally expandable microcapsules) are mixed to prepare a coating liquid for forming the thermally expansive layer 13. Subsequently, the coating liquid is applied on the anchor layer 12 using a known coating device such as a bar coater, a roll coater, or a spray coater. Subsequently, the coating is dried to form the thermally expansive layer 13 as shown in FIG. 3B. Here, in order to obtain a target thickness of the thermally expansive layer 13, the coating liquid may be applied and dried multiple times.

Figure 3C:
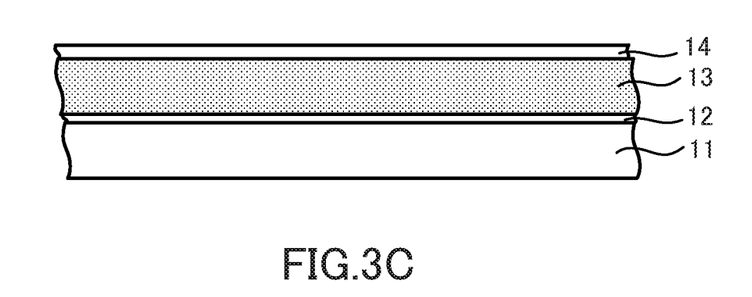

Next, using a material constituting the first ink reception layer 14, for example a material selected from porous silica, PVA, and the like, a coating liquid for forming the first ink reception layer 14 is prepared. Subsequently, the coating liquid is applied on the thermally expansive layer 13 using a known coating device of a system such as a bar coater, a roll coater, or a spray coater. Subsequently, the coating is dried to form the first ink reception layer 14 as shown in FIG. 3C.

Figure 3D:
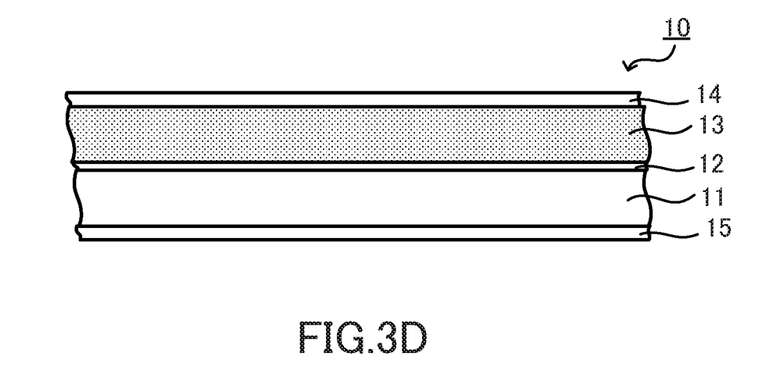

Next, using a material constituting the second ink reception layer 15, for example a material selected from porous silica, PVA, and the like, a coating liquid for forming the second ink reception layer 15 is prepared. Subsequently, the coating liquid is applied on the other side of the base 11 using a known coating device of a system such as a bar coater, a roll coater, or a spray coater. Subsequently, the coating is dried to form the second ink reception layer 15 as shown in FIG. 3D.

Moreover, when the base 11 in the form of a roll is used, the resultant structure is cut into a size suitable for the stereoscopic image formation system (shaping system) 50.

The thermally expandable sheet 10 is produced in the above process.

Here, the step of forming the second ink reception layer 15 may be executed before the step of forming the anchor layer 12.

(Stereoscopic Image Formation System)

Figure 4A:
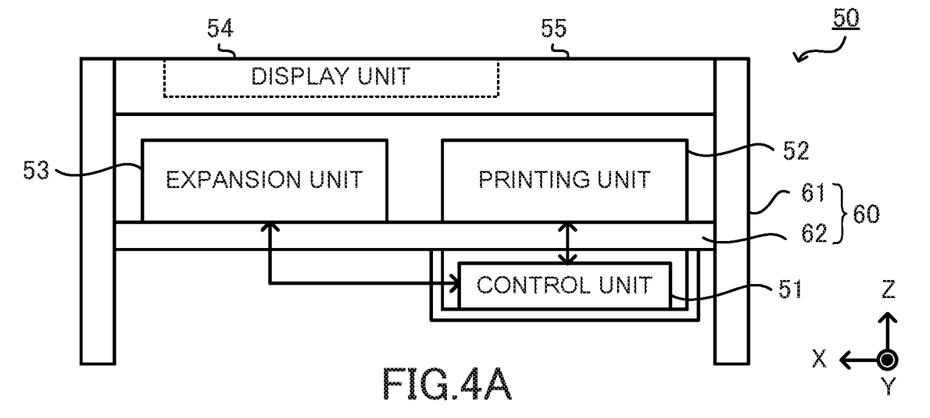
FIGS. 4A to 4C are illustrations outlining the stereoscopic image formation unit according to the embodiment.
Figure 4B:
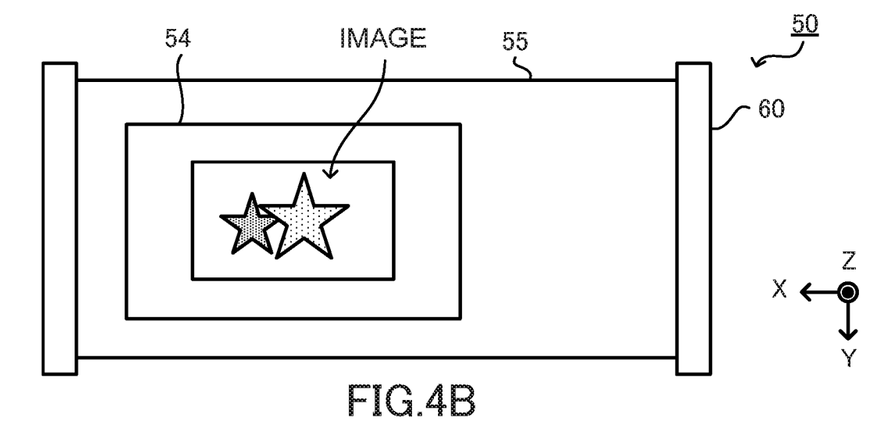
Figure 4C:
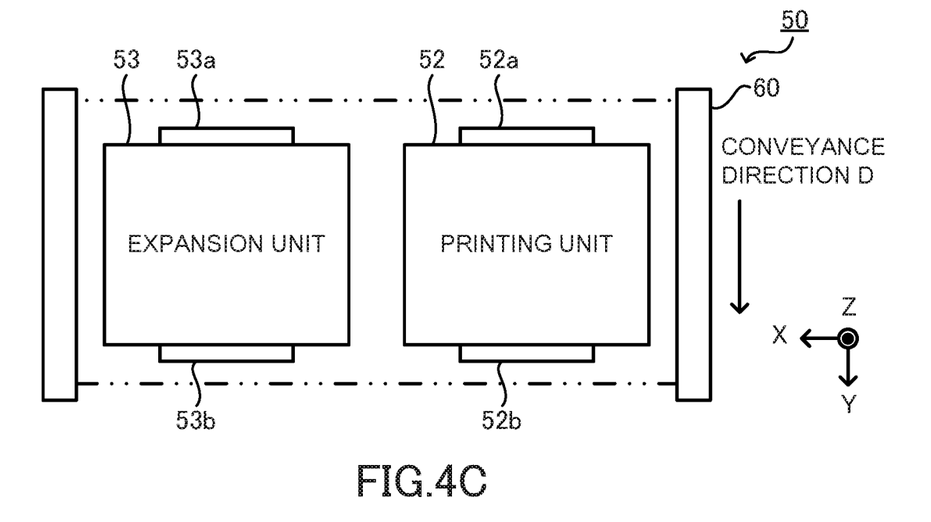

The stereoscopic image formation system 50 forming a stereoscopic image (a stereoscopic object or a shaped object) on the thermally expandable sheet 10 of this embodiment will be described next. As shown in FIGS. 4A to 4C, the stereoscopic image formation system 50 comprises a control unit 51, a printing unit 52, an expansion unit 53, a display unit 54, a top plate 55, and a frame 60. FIG. 4A is a front view of the stereoscopic image formation system 50. FIG. 4B is a plane view of the stereoscopic image formation system 50 with the top plate 55 closed. FIG. 4C is a plane view of the stereoscopic image formation system 50 with the top plate 55 opened. In FIGS. 4A to 4C, the direction X coincides with the horizontal direction, the direction Y coincides with the conveyance direction D in which the sheet is conveyed, and the direction Z coincides with the vertical direction. The directions X, Y, and Z are orthogonal to each other.

The control unit 51, the printing unit 52, and the expansion unit 53 are each placed within the frame 60 as shown in FIG. 4A. Specifically, the frame 60 comprises a pair of nearly rectangular sideboards 61 and a coupling beam 62 provided between the sideboards 61. The top plate 55 extends between the sideboards 61 in the upper part. Moreover, the printing unit 52 and the expansion unit 53 are juxtaposed in the direction X on the coupling beam 62 extending between the sideboards 61. The control unit 51 is fixed underneath the coupling beam 62. The display unit 54 is embedded in the top plate 55 to be flush with the top surface of the top plate 55.

The control unit 51 comprises a central processing unit (CPU), a read only memory (ROM), a random access memory (RAM), and the like and controls the printing unit 52, the expansion unit 53, and the display unit 54.

The printing unit 52 is a printing device of an inkjet system. As shown in FIG. 4C, the printing unit 52 comprises an introducer 52a for introducing the thermally expandable sheet 10 and a discharger 52b for discharging the thermally expandable sheet 10. The printing unit 52 prints a specified image on the front side or the back side of the thermally expandable sheet 10 introduced from the introducer 52a and discharges the thermally expandable sheet 10 on which the image is printed from the discharger 52b. Moreover, the printing unit 52 comprises color inks (cyan (C), magenta (M), and yellow (Y)) for forming a color ink layer 42 described later and black ink (containing carbon black) for forming a front side photothermal conversion layer 41 and a back side photothermal conversion layer 43. Here, for forming black or gray color in the color ink layer 42, carbon black-free black color ink may further be provided as a color ink.

The printing unit 52 acquires from the control unit color image data presenting a color image (the color ink layer 42) to print on the front side of the thermally expandable sheet 10 and prints the color image (the color ink layer 42) using the color inks (cyan, magenta, and yellow) based on the color image data. Black or gray color in the color ink layer 42 is formed by mixing the three, CMY, colors or using carbon black-free black color ink.

Moreover, the printing unit 52 prints the front side photothermal conversion layer 41 using black ink based on front side foaming data that are data presenting parts to foam and distend on the front side of the thermally expandable sheet 10. Similarly, the printing unit 52 prints the back side photothermal conversion layer 43 using black ink based on back side foaming data that are data presenting parts to foam and distend on the back side of the thermally expandable sheet 10. Moreover, carbon black-containing black ink is an example of the material converting electromagnetic waves to heat (for example, an electromagnetic waves-heat conversion material such as carbon), namely the material converting light to heat. The thermally expansive layer distends higher in parts where the black ink density is higher. Therefore, the gradation of the black ink density is determined corresponding to the target heights.

The expansion unit 53 is an expansion device heating and distending the thermally expandable sheet 10. As shown in FIG. 4C, the expansion unit 53 comprises an introducer 53a for introducing the thermally expandable sheet 10 and a discharger 53b for discharging the thermally expandable sheet 10. The expansion unit 53 heats and distends the thermally expandable sheet 10 introduced from the introducer 53a and discharges the distended thermally expandable sheet 10 from the discharger 53b. The expansion unit 53 comprises an irradiator (not shown) therein. The irradiator is, for example, a halogen lamp and irradiates the thermally expandable sheet 10 with light in the near infrared range (wavelengths 750 to 1400 nm), the visible light range (wavelengths 380 to 750 nm), or the mid-infrared range (wavelengths 1400 to 4000 nm). As the thermally expandable sheet 10 on which carbon black-containing black ink is printed is irradiated with light, the light is converted to heat more efficiently in the parts whether the black ink is printed than in the parts where no black ink is printed. Therefore, the thermally expansive layer 13 is mainly heated in the regions where the black ink is printed and consequently, the thermally expansive layer 13 distends in the regions where the black ink is printed.

The display unit 54 comprises a touch panel and the like. The display unit 54 displays, for example as shown in FIG. 4B, an image (stars shown in FIG. 4B) to be printed on the thermally expandable sheet 10 by the printing unit 52. Moreover, the display unit 54 displays operation guidance and the like so that the user can operate the stereoscopic image formation system 50 by touching the display unit 54.

(Stereoscopic Image Formation Process)

The process flow of forming a stereoscopic image on the thermally expandable sheet 10 by the stereoscopic image formation system 50 will be described next with reference to the flowchart shown in FIG. 5 and the cross-sectional views of the thermally expandable sheet 10 shown in FIGS. 6A to 6D.

Figure 6A:
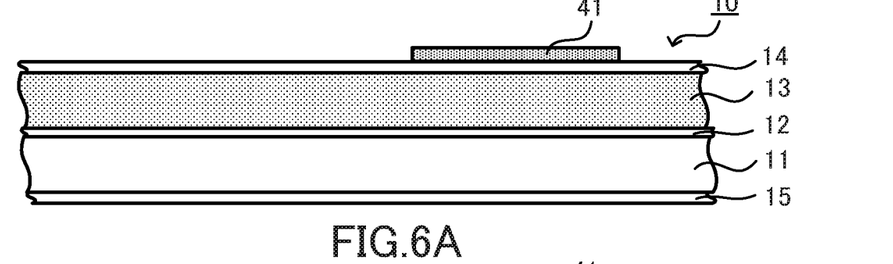
FIGS. 6A to 6D are cross-sectional views schematically showing the stereoscopic image formation process according to the embodiment.

First, the user prepares a thermally expandable sheet 10 before a stereoscopic image is formed, and specifies color image data, front side foaming data, and back side foaming data via the display unit 54. Then, the thermally expandable sheet 10 is inserted into the printing unit 52 with the front side facing up. The printing unit 52 prints a photothermal conversion layer (the front side photothermal conversion layer 41) on the front side of the inserted thermally expandable sheet 10 (Step S1). The front side photothermal conversion layer 41 is a layer formed by a material converting light to heat, specifically carbon black-containing black ink. The printing unit 52 ejects carbon black-containing black ink on the front side of the thermally expandable sheet 10 according to the specified front side foaming data. Consequently, as shown in FIG. 6A, the front side photothermal conversion layer 41 is formed on the first ink reception layer 14. Here, for easier understanding, the front side photothermal conversion layer 41 is shown as if it is formed on the first ink reception layer 14; however, more precisely, the black ink is received in the first ink reception layer 14 and therefore, the photothermal conversion layer 41 is formed in the first ink reception layer 14.

Figure 6B:
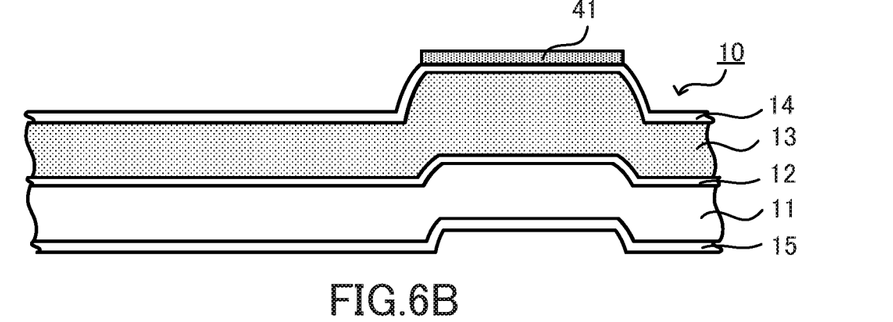

Secondly, the user inserts the thermally expandable sheet 10 on which the photothermal conversion layer 41 is printed into the expansion unit 53 with the front side facing up. The expansion unit 53 heats the inserted thermally expandable sheet 10 from the front side. Specifically speaking, the expansion unit 53 irradiates the front side of the thermally expandable sheet 10 by the irradiator (Step S2). The front side photothermal conversion layer 41 printed on the front side of the thermally expandable sheet 10 absorbs light irradiated by irradiator and generates heat. Consequently, as shown in FIG. 6B, the region of the thermally expandable sheet 10 where the photothermal conversion layer 41 is printed rises and distends. Particularly in this embodiment, the base 11 under the region where the photothermal conversion layer 41 is printed rises and deforms upward as shown in FIG. 6B as the thermally expansive layer 13 distends. As a result, a recess (indentation) is formed in the underside of the base 11.

Figure 6C:
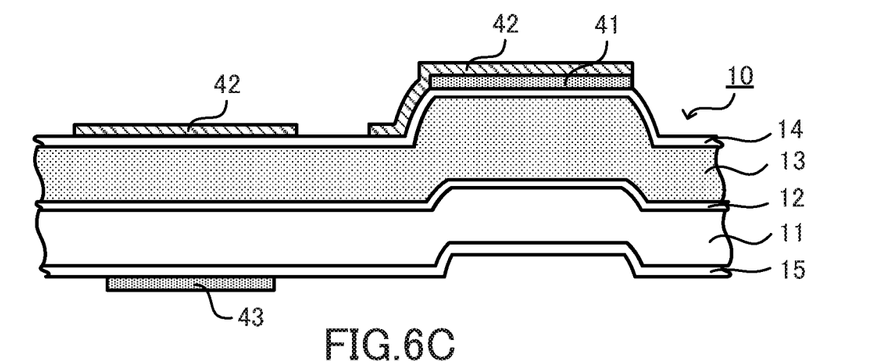

Thirdly, the user inserts the thermally expandable sheet 10 of which the front side is heated and distended into the printing unit 52 with the front side facing up. The printing unit 52 prints a color image (the color ink layer 42) on the front side of the inserted thermally expandable sheet 10 (Step S3). Specifically, the printing unit 52 ejects cyan C, magenta M, and yellow Y inks on the front side of the thermally expandable sheet 10 according to the specified color image data. Consequently, as shown in FIG. 6C, the color ink layer 42 is formed on the first ink reception layer 14 and the photothermal conversion layer 41.

Fourthly, the user inserts the thermally expandable sheet 10 on which the color ink layer 42 is printed into the expansion unit 53 with the back side facing up. The expansion unit 53 heats the inserted thermally expandable sheet 10 from the back side and dries the color ink layer 42 formed on the front side of the thermally expandable sheet 10 (Step S4). Specifically speaking, the expansion unit 53 emits light to the back side of the thermally expandable sheet 10 by means of the irradiator to heat the color ink layer 42 and evaporate the solvent contained in the color ink layer 42.

Fifthly, the user inserts the thermally expandable sheet 10 on which the color ink layer 42 is printed into the printing unit 52 with the back side facing up. The printing unit 52 prints a photothermal conversion layer (the back side photothermal conversion layer 43) on the second ink reception layer 15 provided on the back side of the inserted thermally expandable sheet 10 (Step S5). Like the front side photothermal conversion layer 41 printed on the front side of the thermally expandable sheet 10, the back side photothermal conversion layer 43 is a layer formed by a material converting light to heat, specifically carbon black-containing black ink. The printing unit 52 ejects carbon black-containing black ink on the back side of the thermally expandable sheet 10 according to the specified back side foaming data. Consequently, as shown in FIG. 6C, the photothermal conversion layer 43 is formed on the back side of the base 11.

Figure 6D:
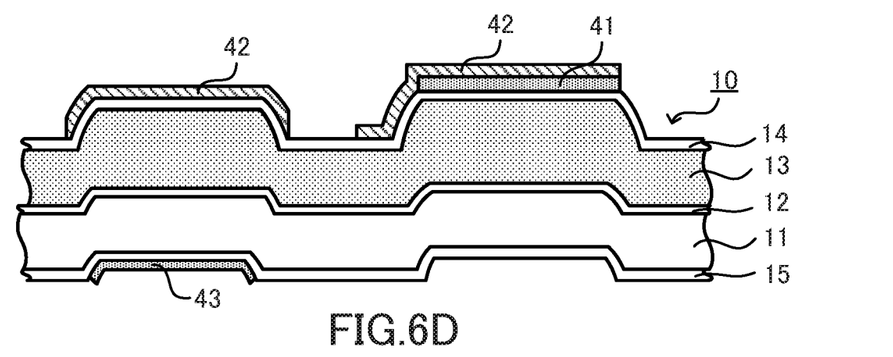

Sixthly, the user inserts the thermally expandable sheet 10 on which the back side photothermal conversion layer 43 is printed into the expansion unit 53 with the back side facing up. The expansion unit 53 heats the inserted thermally expandable sheet 10 from the back side. Specifically speaking, the expansion unit 53 irradiates the back side of the thermally expandable sheet 10 by the irradiator (not shown) (Step S6). The photothermal conversion layer 43 printed on the back side of the thermally expandable sheet 10 absorbs the light irradiated by the irradiator and generates heat. Consequently, as shown in FIG. 6D, the region of the thermally expandable sheet 10 where the photothermal conversion layer 43 is printed rises and distends. Moreover, particularly in this embodiment, the base 11 above the region where the back side photothermal conversion layer 43 is printed rises and deforms upward as shown in FIG. 6D as the thermally expansive layer 13 distends. As a result, a recess (indentation) is formed in the underside of the base 11.

A stereoscopic image (a stereoscopic object or a shaped object) is formed on the thermally expandable sheet 10 in the above proceeding.

Figure 5:
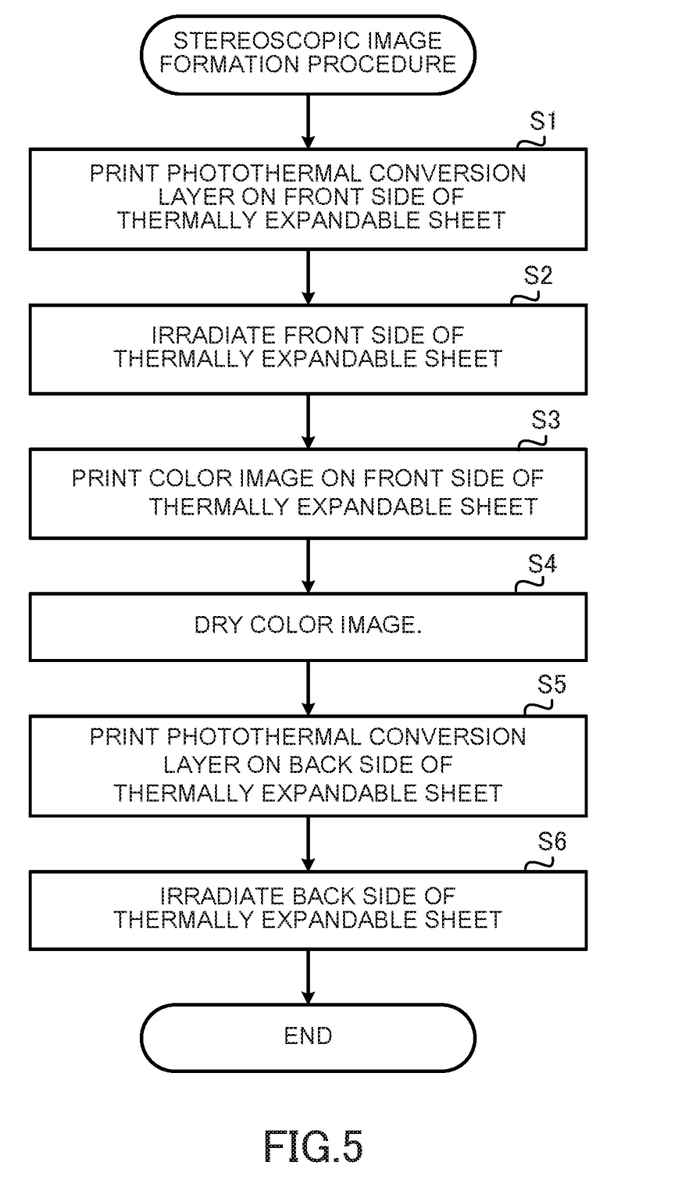
FIG. 5 is a flowchart showing the stereoscopic image formation process according to the embodiment.

Here, FIGS. 5 and 6A to 6D show an exemplary configuration in which the photothermal conversion layer is formed on the front side and the back side of the thermally expandable sheet 10 and the thermally expansive layer 13 is foamed and distended from the front side and the back side of the thermally expandable sheet 10. However, the photothermal conversion layer may be formed only on the front side or only on the back side. The steps S1 to S4 shown in FIG. 5 are executed when the photothermal conversion layer is formed only on the front side, and the steps S3 to S6 shown in FIG. 5 are executed when the photothermal conversion layer is formed only on the back side. Moreover, the order of these steps can be changed as appropriate.

An exemplary case of distending the thermally expansive layers of thermally expandable sheets different in base material and thickness as the thermally expandable sheet of this embodiment and measuring the distension height and the like will be described next. As exemplary thermally expandable sheets of this embodiment, paper of 100 μm in thickness, a PET film of 100 μm in thickness, and a PET film of 50 μm in thickness were prepared as the base and a thermally expansive layer of the same condition (thickness and material) was formed on these bases. Moreover, as an exemplary prior art thermally expandable sheet, a thermally expansive layer of the same condition was formed on paper of 190 μm in thickness. Photothermal conversion layers different in black density were formed on the surfaces of these thermally expandable sheets and irradiated with light under the same conditions to foam and distend the thermally expansive layers. The thermally expansive layers were formed only on the front side of the thermally expandable sheets and the thermally expansive layers were all the same in shape.

Figure 7A:
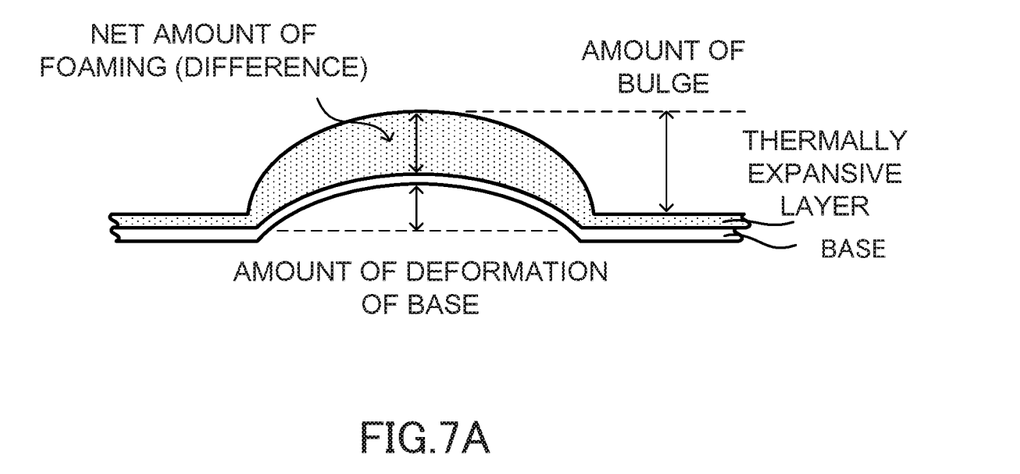
FIG. 7A is an illustration for explaining the measuring points after the thermally expansive layer of the thermally expandable sheet is distended.
Figure 7B:
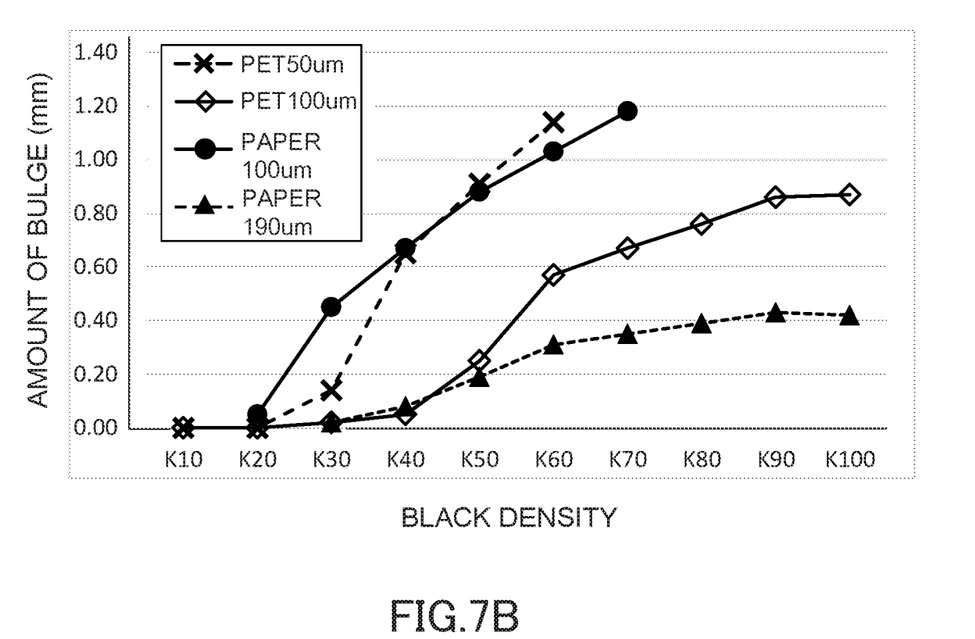
FIG. 7B is a graph showing the relationship between the black density of the photothermal conversion layer and the amount of bulge on the bases.
Figure 8A:
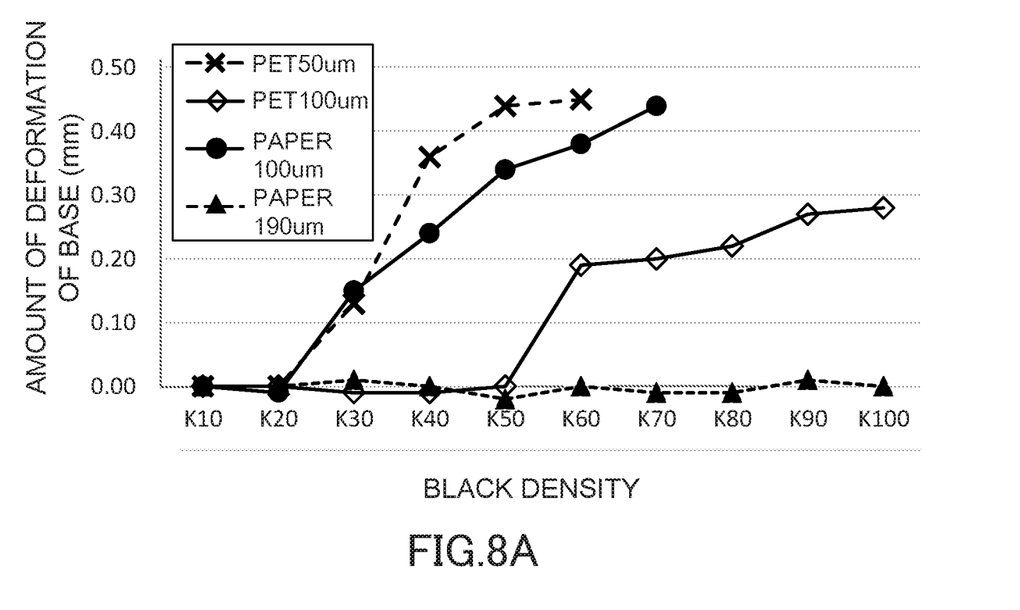
FIG. 8A is a graph showing the relationship between the black density of the photothermal conversion layer and the amount of deformation of the base on the bases.
Figure 8B:
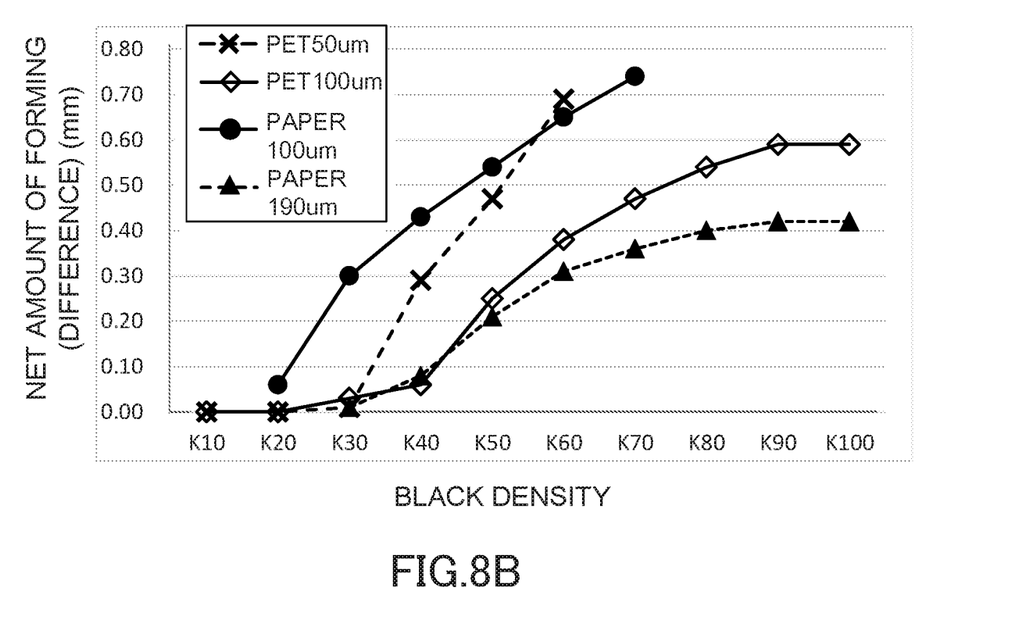
FIG. 8B is a graph showing the relationship between the black density of the photothermal conversion layer and the net amount of foaming (difference) on the bases.

Of each sheet in which the thermally expansive layer was distended as described above, the distension height of the thermally expansive layer from the top surface of the thermally expansive layer (the amount of bulge) and the amount of deformation of the indentation of the base 11 from the level of the top surface of the base 11 (the amount of deformation of the base), which are shown in FIG. 7A, were measured. Moreover, the net amount of foaming (distension) (difference) was calculated by subtracting the amount of deformation of the base from the amount of bulge. FIGS. 7B, 8A, and 8B show the relationship of the amount of bulge, the amount of deformation of the base, and the difference measured as described above to the black density. Here, in FIGS. 7B, 8A, and 8B, the black density presents the black (K) density in color data for printing the photothermal conversion layer. K100 is totally black (K100%). K10, K20, K30, K40, K50, K60, K70, K80, and K90 present black (K) densities in color data of 10%, 20%, 30%, 40%, 50%, 60%, 70%, 80%, and 90%, respectively.

First, as shown in FIG. 7B, it is understood that larger distension heights (amounts of bulge) were obtained on the PET of 50 μm and the paper of 100 μm particularly compared with the paper of 190 μm. Larger distension heights were also obtained on the PET of 100 μm compared with the paper of 190 μm particularly at the densities of K60 and higher. Here, the thermally expansive layer excessively distended and separated from the base on the paper of 100 μm at the densities of K80 and higher and on the PET of 50 μm at the densities of K70 and higher.

Next, as shown in FIG. 8A, the paper of 190 μm showed almost no deformation of the base at any density. Conversely, the paper of 100 μm, the PET of 50 μm, and the PET of 100 μm all showed deformation of the base. Particularly, the PET of 50 μm and the paper of 100 μm showed deformation of the base at K30 and higher and the PET 100 μm showed the amount of deformation of the base relatively levelling off at the densities of K60 and higher.

As described above, from FIGS. 7B and 8A, with the addition of the amount of deformation of the base, the amount of bulge was obviously increased on the paper of 100 μm, the PET of 50 μm, and the PET of 100 μm showing deformation of the base compared with the paper of 190 μm showing no deformation of the base. Moreover, as shown in FIG. 8B, the net amount of foaming (difference) was also prone to increase on the paper of 100 μm, the PET of 50 μm, and the PET of 100 µm showing deformation of the base compared with the paper of 190 µm. Hence, it can be said that the thermally expandable sheet of this embodiment can increase the distension height of the thermally expansive layer by making the base deform following distension of the thermally expansive layer.

Moreover, from FIGS. 7B, 8A, and 8B, comparison between the paper of 100 µm and the PET of 100 µm having the same thickness revealed that the paper of 100 µm is superior in all of the amount of bulge, the amount of deformation of the base, and the difference. Comparison between the PET of 50 µm and the PET of 100 µm, which are the same in material but different in thickness, revealed that the PET of 50 µm is superior in all of the amount of bulge, the amount of deformation of the base, and the difference. Moreover, comparison between the paper of 100 µm and the paper of 190 µm revealed that the paper of 100 µm is superior in all of the amount of bulge, the amount of deformation of the base, and the difference. Furthermore, for example, comparison between the amount of bulge on the PET of 50 µm and the paper of 100 µm and the amount of bulge on the paper of 190 µm revealed that the amount of bulge on the PET of 50 µm and the paper of 100 µm is double or more the amount of bulge on the paper of 190 µm. Hence, using a base deforming following the thermally expansive layer, it is possible to distend the thermally expansive layer higher when the thermally expansive layer has the same thickness. On the other hand, it is possible to obtain nearly the same level of height as a thermally expandable sheet of which the base does not deform even if the thickness of the thermally expansive layer is reduced.

As described above, the thermally expandable sheet of this embodiment makes the base 11 deform following distension of the thermally expansive layer 13, whereby it is possible to increase the distensible height of the thermally expandable sheet 10 without increasing the thickness of the thermally expansive layer 13. Moreover, for the same extension height, it is possible to reduce the thickness of the thermally expansive layer 13 and thus reduce the thickness of the thermally expandable sheet 10.

The present disclosure is not confined to the above-described embodiment and various modifications and applications are available.

When the thermally expandable sheet 10 is attached to a container or the like for use, adhesive and release paper may be provided on the back side of the base 11. In such a case, it is recommended to form the second ink reception layer 15 on the release paper. Moreover, the anchor layer 12 can be formed by a material other than the above-described.

Here, the drawings used in the embodiments are all intended for explaining the embodiments. Therefore, there is no intention to give limited interpretation of the thicknesses of the layers of the thermally expandable sheet being formed at the ratios shown in the figures.

Several embodiments of the present disclosure are described above. The present disclosure is included in the disclosure described in the scope of claims and its equivalent scope.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A thermally expandable sheet comprising:
   a base, wherein the base, prior to heating, is arranged on a plane;
   a thermally expansive layer formed on one side of the base facing a predetermined direction; and
   an anchor layer formed between the one side of the base and the thermally expansive layer,
   wherein the anchor layer is configured to adhere the base to the thermally expansive layer,
   wherein a thickness of the base is equal to or less than a thickness of the thermally expansive layer,
   wherein the thermally expansive layer comprises a binder and particles of thermally expandable material configured to expand in response to heating of the thermally expandable material dispersed in the binder,
   wherein, upon heating, a portion of the thermally expansive layer is configured to distend in the predetermined direction by expansion of the thermally expandable material, and
   wherein the base is configured such that a portion of the base is configured to be deformed in the predetermined direction by the distension of the portion of the thermally expansive layer in the predetermined direction into an embossed shape.

2. The thermally expandable sheet according to claim 1, wherein the anchor layer comprises polyester/acryl/urethane composite resin.

3. The thermally expandable sheet according to claim 2, further comprising:
   a first ink reception layer formed on the thermally expansive layer to be separated from the base by the thermally expansive layer,
   wherein the first ink reception layer is configured to receive ink.

4. The thermally expandable sheet according to claim 3, further comprising:
   a second ink reception layer formed on another side of the base opposite to the one side of the base,
   wherein the second ink reception layer is configured to receive ink.

5. The thermally expandable sheet according to claim 4, wherein the first ink reception layer and the second ink reception layer comprise the same material.

6. The thermally expandable sheet according to claim 1, wherein the base is a resin base.

7. The thermally expandable sheet according to claim 1, wherein the base comprises at least one resin among polyolefin-based resin, polyester-based resin, polyamide-based resin, polyvinyl chloride-based resin, polyimide-based resin, and silicone-based resin.

8. A thermally expandable sheet comprising:
   a base, wherein the base, prior to heating, is arranged on a plane; and
   a thermally expansive layer formed on one side of the base facing a predetermined direction; and
   a first ink reception layer formed on the thermally expansive layer to be separated from the base by the thermally expansive layer,
   wherein the first ink reception layer is configured to receive ink,
   wherein a thickness of the base is equal to or less than a thickness of the thermally expansive layer,
   wherein the thermally expansive layer comprises a binder and particles of thermally expandable material configured to expand in response to heating of the thermally expandable material dispersed in the binder, wherein, upon heating, a portion of the thermally expansive layer is configured to distend in the predetermined direction by expansion of the thermally expandable material, and wherein the base is configured such that a portion of the base is configured to be deformed in the predetermined direction by the distension of the portion of the thermally expansive layer in the predetermined direction into an embossed shape.

9. The thermally expandable sheet according to claim 8, further comprising:

a second ink reception layer formed on another side of the base opposite to the one side of the base, wherein the second ink reception layer is configured to receive ink.

10. The thermally expandable sheet according to claim 9, wherein the first ink reception layer and the second ink reception layer comprise the same material.

11. The thermally expandable sheet according to claim 8, wherein the base comprises at least one resin among polyolefin-based resin, polyester-based resin, polyamide-based resin, polyvinyl chloride-based resin, polyimide-based resin, and silicone-based resin.

12. The thermally expandable sheet according to claim 8, wherein the base is a resin base.

13. The thermally expandable sheet according to claim 8, further comprising:

an anchor layer formed between the one side of the base and the thermally expansive layer, wherein the anchor layer is configured to adhere the base to the thermally expansive layer.

14. The thermally expandable sheet according to claim 13, wherein the anchor layer comprises polyester/acryl/urethane composite resin.

* * * * *